March 22, 1966  R. B. TABOR  3,241,605

THERMAL DISSIPATOR

Filed April 10, 1962  3 Sheets-Sheet 1

ROBERT B. TABOR
INVENTOR.

BY Norman L. Chalfin
Agt.

March 22, 1966 R. B. TABOR 3,241,605
THERMAL DISSIPATOR

Filed April 10, 1962 3 Sheets-Sheet 2

ROBERT B. TABOR
*INVENTOR.*

BY Norman L. Chalfin

March 22, 1966     R. B. TABOR     3,241,605

THERMAL DISSIPATOR

Filed April 10, 1962     3 Sheets-Sheet 3

ROBERT B. TABOR
INVENTOR.

BY Norman L. Chalfin
Agt.

United States Patent Office 3,241,605
Patented Mar. 22, 1966

3,241,605
THERMAL DISSIPATOR
Robert B. Tabor, Pacoima, Calif., assignor to U.S. Heat Sink, Inglewood, Calif., a partnership
Filed Apr. 10, 1962, Ser. No. 186,418
1 Claim. (Cl. 165—80)

This invention relates to thermal dissipators and more particularly to a novel heat sink device formed from a single element and particularly adapted to use with power transistors.

The invention herein contemplates a novel use of a unitary article to form a substantial thermal radiation surface. Embodiments thereof are devised to accommodate the different varieties and transistor cases and provides substantial radiation surface area. Because of the unity of the material from which the heat sinks are formed, they provide little likelihood of the kinds of problems which can be encountered from the use of heat sinks produced from assemblies of parts. This is particularly so where such parts are of dissimilar metals and are likely sources of undesirable potentials and possible corrosion.

It is therefore an object of this invention to provide a means of thermal radiation for transistors wherein the means are formed from a unitary substance and have a large radiation surface area.

It is another object of the invention to provide radiation devices having substantial radiation surface area formed from a unitary substance.

It is still another object of the invention to provide heat devices for transistors wherein means are provided to accommodate the transistor and to hold it in place.

It is a still further object of the invention to provide heat sinks of novel design derived from a cylindrical unitary source into which are cut substantial radiation surface areas, the use of a unitary substance eliminating problems inherent in assemblies of articles employing several parts.

These and other objects of the invention will become more clear from the specification which follows and the appended claims taken together with the figures in which:

Figure 1:
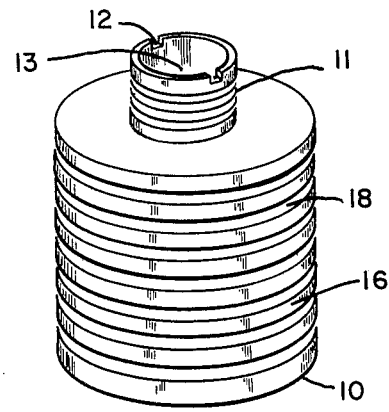
FIGURE 1 is a perspective view from top left of one embodiment of the invention showing its assembly.

Referring now to FIGURES 1 through 5 taken together. There is shown a type of heat sink according to this invention particularly useful for transistors and nuvistors which have a flanged case wherein the flange extends about the periphery of the transistor at the surface from which the connection leads protrude.

In FIGURES 1 through 5 the article can be seen to comprise two parts—a radiator portion 10 and a threaded insert 11 which screws into the top surface of radiator 10. Radiator 10 is formed of a cylinder of an outer diameter as shown by disc exterior 16 undercut to a central bore 18. The article 10 is produced from a single cylinder of metal to form the stack of discs 16 on case 18 as clearly shown in FIGURE 5.

Figure 2:
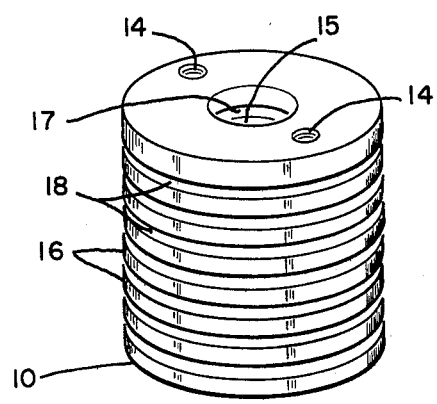
FIGURE 2 is a perspective view from the bottom of the article shown in FIGURE 1.
Figure 3:
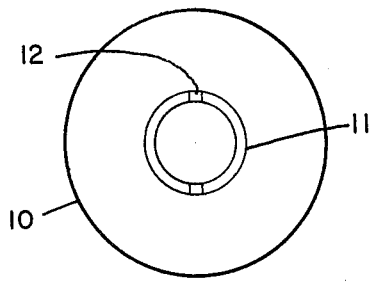
FIGURE 3 is a top plan view of the article in FIGURE 1.
Figure 4:
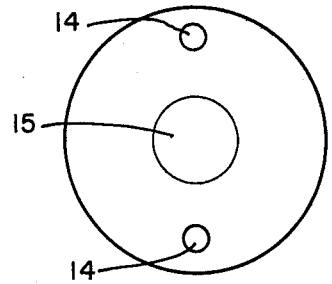
FIGURE 4 is a bottom plan view of the article of FIGURE 1.
Figure 5:
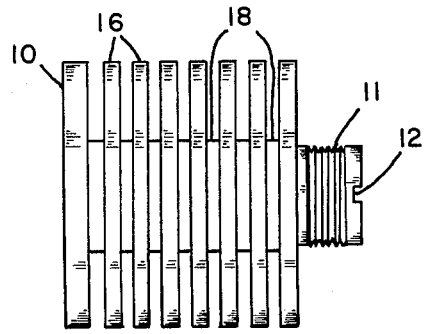
FIGURE 5 is a side elevational view of the article shown in FIGURE 1.
Figure 6:
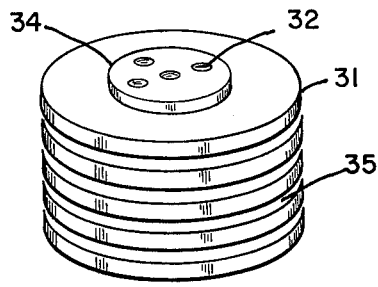
FIGURE 6 is a bottom perspective view of another embodiment of the invention.
Figure 7:
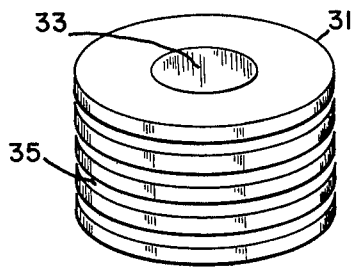
FIGURE 7 is a top perspective view of the article shown in FIGURE 6.
Figure 8:
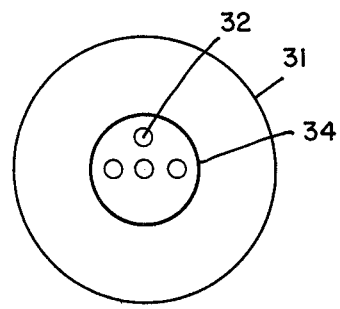
FIGURES 8 and 9 show bottom and top plan views, respectively, of the article shown in FIGURE 6.
Figure 9:
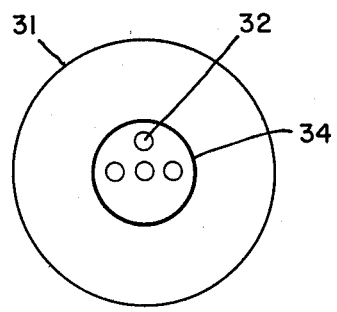
Figure 10:
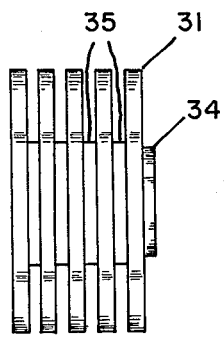
FIGURE 10 shows the article of FIGURE 6 in a side elevational view.
Figure 11:
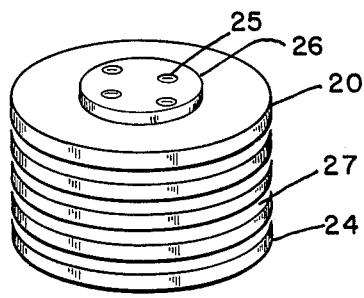
FIGURE 11 is a bottom perspective view of a third embodiment of the invention for another form of transistor.
Figure 12:
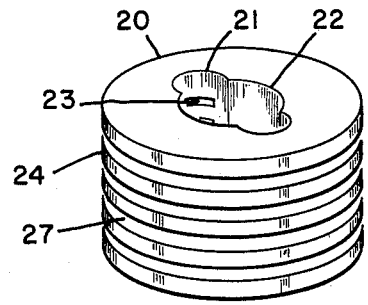
FIGURE 12 is a top perspective view of the article shown in FIGURE 11.
Figure 13:
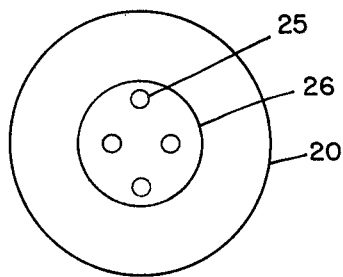
FIGURES 13 and 14 show bottom and top plan views of the article in FIGURE 11.
Figure 14:
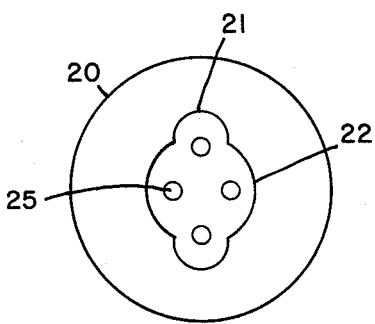
Figure 15:
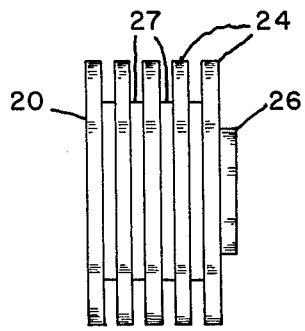
FIGURE 15 shows a side elevational view of the article illustrated in FIGURE 11.

In the top of insert 11 there are cross slots 12 to permit the use of a screw driver in setting insert 11 into the threaded aperture 15 (see FIGURES 2 and 4).

At the bottom of heat sink 10 there are threaded mounting holes 14 uniformly positioned on a diameter thereof and an opening 17 somewhat smaller in diameter than the threaded aperture 15 forming internally a flange seat for the transistor or nuvistor case flange previously described.

After the flange cased transistor or nuvistor is inserted into aperture 15 from the top, threaded insert 11 is inserted and is screwed down tightly on the transistor flange to hold it in place within aperture 15. The leads or terminal pins of the transistor or nuvistor project out of opening 17 in the bottom of the device.

In the embodiment shown in FIGURES 6 through 10, inclusive, small transistor devices not flanged may be inserted. Referring to FIGURES 6 through 10 taken together, the thermal dissipator shown therein is fabricated from a solid material in the same manner as that shown in FIGURES 1 through 5, and includes the stack of discs such as 31 and undercut area 35 forming the case thereof as seen in the bottom view of FIGURE 6. The bottom of the unit has a central base smaller in diameter than discs 31 which includes foramina such as 32 to receive transistor leads. As may be seen in FIGURE 7 the transistor is inserted into an aperture 33 provided therefor in the center of case 35.

In FIGURES 11 through 15 an arrangement of the heat dissipators according to the invention is shown for the power transistor devices which have their case structures in the general form of a bowler hat, the case being connected to the collector thereof and a pair of pins protruding from beneath the flat brimmed area of the transistor to connect to base and emitter circuit elements.

Referring now to FIGURES 11 through 15 it may be seen that the structure is similar to that of FIGURES 6–10 but is relatively large in diameter and flat to accommodate the power transistors. The unit 20 is again formed from a solid cylinder machined to conform to the configuration shown wherein the central aperture 22 has continuing extension holes 21 drilled at either end to form together the receiving aperture 21–22 for the power transistor. Disc radiators 24 where drilled at 21 leave slots 23 in the otherwise continuous inner surface as may be seen in FIGURE 12. The foramina, 25 are provided to receive the contact pins of a transistor and the mounting screws thereof which are inserted through the receiving aperture portions 21. As may be seen at 26 an extra thickness is provided in base 26 which is as large in diameter as the longest dimension of a transistor inserted in aperture 21. This provides better support for the transistor.

It may be seen that in accordance with this invention as hereinabove described, thermal radiation devices are fabricated from a single cylinder of material to form a stack of disc-like surfaces separated from one another by an air space, forming the central core of the disc surfaces. The inner surfaces of the case being bored to receive a transistor or similar device.

What is claimed as new is:

A heat dissipating support and mounting device for power transistors, said heat dissipating support comprising:

a solid circular body substantially greater in diameter than in height, having a plurality of uniformly spaced horizontal grooves of generally rectangular cross section, each extending horizontally and equidistantly into the vertical outer faces of said body to a depth substantially less than half the diameter of said body; said body having a top surface and a bottom surface;

the top surface of said body having a central, generally oval-shaped opening therein having a configuration comprising three bores: a large central bore forming the first bore, and a pair of smaller bores intersecting said central bore, said three bores having a common floor surface, the radii of said pair of bores being less than the distance between the outer edge of said central bore and the locus of the center of said smaller bores thereby forming a communicating opening between said smaller bores and said large central bore; and foraminae in said common floor surface for all three bores, the foraminae being formed to receive contact pins of a transistor at the base of said large central bore and the foraminae being formed at the base of said smaller bores to receive mounting hardware to secure said transistors to said common floor surface, whereby, said body and said horizontal grooves provide a substantial heat dissipating surface area in all of the exposed surfaces thereof, and of said three bores, and communicate the heat to said dissipating surfaces through the walls of said bores which are continuous with one another and with said body of said heat dissipator.

References Cited by the Examiner

UNITED STATES PATENTS

| | | |
|---|---|---|
| 2,862,158 | 11/1958 | Stelmak et al. |
| 2,994,017 | 7/1961 | Kadelburg. |
| 3,033,537 | 5/1962 | Brown _____ 317—234 X |

ROBERT A. O'LEARY, *Primary Examiner.*

DAVID GALVIN, CHARLES SUKALO, *Examiners.*

J. A. ATKINS, A. W. DAVIS, *Assistant Examiners.*